United States Patent
Capretta et al.

(10) Patent No.: US 8,014,379 B2
(45) Date of Patent: Sep. 6, 2011

(54) CORRELATION OF ACCESS CODE FOR BLUETOOTH SYNCHRONIZATION

(75) Inventors: Pietro Capretta, Brussels (BE); Viktor Belokonskiy, Zaventem (BE); Alberto Gozzi, Brussels (IT)

(73) Assignee: ST-Ericsson SA, Plan-Les-Ouates (CH)

( * ) Notice: Subject to any disclaimer, the term of this patent is extended or adjusted under 35 U.S.C. 154(b) by 985 days.

(21) Appl. No.: 11/863,865

(22) Filed: Sep. 28, 2007

(65) Prior Publication Data
US 2009/0086711 A1 Apr. 2, 2009

(51) Int. Cl.
*H04J 3/06* (2006.01)
(52) U.S. Cl. .................. 370/350; 370/509; 375/149
(58) Field of Classification Search .................. 370/350, 370/503, 504, 506, 509, 510, 511, 512, 513, 370/514; 375/134, 137, 145, 149–150
See application file for complete search history.

(56) References Cited

U.S. PATENT DOCUMENTS

| | | | | |
|---|---|---|---|---|
| 5,574,754 | A * | 11/1996 | Kurihara et al. | 375/367 |
| 6,421,371 | B1 * | 7/2002 | Sourour et al. | 375/142 |
| 6,587,500 | B1 * | 7/2003 | Persson et al. | 375/142 |
| 7,349,680 | B2 * | 3/2008 | Ibrahim et al. | 455/260 |
| 2005/0220051 | A1 * | 10/2005 | Lavean | 370/330 |
| 2006/0133291 | A1 * | 6/2006 | Kim et al. | 370/252 |
| 2007/0036247 | A1 * | 2/2007 | Capretta et al. | 375/343 |
| 2009/0180464 | A1 * | 7/2009 | Walley et al. | 370/350 |

* cited by examiner

*Primary Examiner* — Chi H. Pham
*Assistant Examiner* — Kevin Mew
(74) *Attorney, Agent, or Firm* — Howison & Arnott, L.L.P.

(57) ABSTRACT

A circuit for processing a packet based signal received over a Bluetooth radio link has a correlator to detect at least part of the access code. A correlator controller, reconfigures the correlator according to a timing of the access code, to detect at least part of the EDR synchronization sequence, and a demodulator demodulates the payload according to the detection. The correlator has an input signal register, a buffer for a sequence of at least part of the wanted signal values, and a series of comparators arranged to compare input signal values with corresponding ones of the wanted signal values at more than one offset. By such dual use of the same correlator, the receiver can be made more cost effective.

31 Claims, 15 Drawing Sheets

CORRELATION OF ACCESS CODE FOR BLUETOOTH SYNCHRONIZATION

BACKGROUND OF THE INVENTION

1. Field of the Invention

This invention relates to circuits for receivers, to receivers, to systems having such receivers, and to methods of processing received signals. The present invention relates particularly to circuits for wireless receivers, to wireless receivers, to systems having such wireless receivers, and to methods of processing received radio signals.

2. Description of the Related Art

Bluetooth is a well known wireless protocol that describes how had held devices of II kinds such a PDA's, smart phones, mobile phones, computers, laptops, palmtops, peripherals and other devices can interconnect using a short-range wireless connection. The specifications of the Bluetooth System, v1.0B, Dec. 1, 1999, and later versions, such as v1.2 and v2.0, are publicly available, and the reader is referred to these documents for more details. Bluetooth is a packet based frequency hopping protocol. A receiver typically has signal processing functions for waveform demodulation, DC compensation, bit synchronization and bit detection. Waveform demodulation usually is implemented in receive path of a radio receive module and is wireless protocol dependent. DC compensation can be implemented either in the receive module or in a subsequent baseband processing part. Bit synchronization and detection are usually implemented in the baseband and are common to many different wireless receivers. All Bluetooth data is transmitted as part of a packet. Standard rate packets are made up of four sections:

Access Code—The receiving device uses this to recognise incoming transmissions. It is a series of symbols to identify the start of a radio packet. It has a fixed length. In a normal communication mode, the master and slave units use the Master ID as the Access Code. As there is only one master unit in a network, the Master ID identifies the network.

Header—Describes the packet type and length.

Payload—The actual data.

Inter-Packet Guard Band—to enable retuning to the next frequency.

In the Bluetooth 1.2 specification, the access code, header and payload are modulated using Gaussian frequency-shift keying (GFSK) to modulate the over-air RF signal. In GFSK, the carrier frequency deviates by +/−160 kHz to indicate a one or a zero thus encoding one bit per symbol. The symbol rate is 1 MSymbol/s, leading to a peak data rate of 1 Mbit/s. But, when designers account for access codes, headers, and guard bands, Bluetooth systems can deliver a maximum payload data rate of 723 kbit/s.

To provide a higher data rate, the EDR (Enhanced Data Rate) protocol defines additional packet types having new modulation schemes for payload data. In the Bluetooth 2.0 specification, EDR packets use GFSK modulation for the access code and header, and one of two different modulation schemes for the payload. The change of modulation scheme also requires the insertion of a small guard band and a synchronization word between the header and the payload. EDR data uses $\pi/4$ differential quaternary phase-shift keying ($\pi/4$-DQPSK), or eight-phase differential phase-shift keying (8DPSK), both of which involve altering the phase of the carrier rather than the frequency.

The receiving radio needs to be able to switch modulation schemes between the header and the payload. A Bluetooth packet-header contains 4 bits for packet identification, and messages can be exchanged so that EDR compatible radios can switch between modes. from 1 Mbit/s, to 2- or 3-Mbit/s modes. This is typically all handled by lower Bluetooth stack layers embedded into chips, and below the HCI interface used by higher level application layers.

In a known transmitter-receiver device (WO 00/18150) for a digital communications system a radio signal received from an aerial is demodulated in the receiver circuit in order to generate a digital input signal. This digital input signal is supplied to a synchronization circuit, which compares the input signal with an expected access code, in order to accept the data packet if the received access code is identical to the expected access code. Otherwise the received input signal is rejected. In order to enable a bit by bit comparison between a digital input signal and an expected access code or synchronization word, the corresponding bit value is allocated to each symbol in the input signal corresponding to a bit in the input signal in that the signal level of the input signal for each symbol is compared with a threshold value, corresponding to an estimated or expected d.c. voltage quota.

US patent application 2002048330 shows a device for identifying a data packet in a data stream, in a Bluetooth receiver for example. The d.c. voltage quota for a demodulated digital input signal is calculated, a k-bit word is allocated to the input signal, in that for each symbol of the input signal corresponding to a bit a bit value of 1 or 0 is determined as a function of the d.c. voltage quota, the k-bit word corresponding to the input signal is compared with an expected k-bit synchronization word. This provides a correlation value and a packet identification signal is generated if the correlation value is greater than a correlation threshold value.

SUMMARY OF THE INVENTION

An object of the invention is to provide improved circuits for receivers, receivers, to systems having such receivers, and methods of processing received signals. In particular an object of the present invention is to provide circuits for wireless receivers, wireless receivers, systems having such wireless receivers, and to methods of processing received radio signals.

According to a first aspect, the invention provides:

A circuit for processing a packet based signal received over a radio link and having a data packet having an access code modulated using a first modulation scheme and a synchronization sequence for a payload modulated using a second modulation scheme, the circuit having;

a correlator arranged to detect at least part of the access code, a correlator controller to reconfigure the correlator according to a timing of the access code, to detect at least part of the synchronization sequence, and a demodulator for demodulating the payload according to a timing of the synchronization sequence.

The access code may be used in a series of parts and at least two of the parts can be extracted at two different frequencies.

The correlator may have an input signal register, a buffer for buffering a sequence of at least part of the wanted signal values, and a series of comparators arranged to compare each of a sequence of input signal values in the shift register with corresponding ones of the sequence of wanted signal values in the buffer, with an adjustable offset between the sequences, and accumulate the comparisons.

The correlator may be arranged to evaluate correlation at more than one offset before the controller updates the input signal register.

The controller may be arranged to detect a first part of the access code, and according to the detection of the first part, to alter the sequence of wanted values to detect a further part of the access code, or to detect the synchronization sequence.

The controller may be arranged to reconfigure the correlator by altering any of: an update rate of the input signal register, a length of the sequences, which ones of the comparators are switched off, or a division of the input signal register into two or more parallel coupled shift registers.

The receiver may have an interpolator for altering a rate of the input signal input to the input signal register.

The controller may be arranged to use the detection of at least part of the access code to set a correlation window for a subsequent correlation.

The received radio signal may be any one usable for a LAN or PAN, e.g. may be a Bluetooth protocol signal.

The synchronization sequence may be an EDR synchronization sequence, and the access code being a basic rate access code.

In another aspect a receiver is provided having an RF receive part for providing an IF output, a circuit as set out above, for processing the IF output as an input signal, a demodulator for demodulating the input signal according to an output of the circuit, and a baseband processing part.

In another aspect the present invention provides a system having such a receiver and an application part coupled to an output of the baseband processing part.

In another aspect the present invention provides a method of processing a packet based signal received over a radio link, the signal having a data packet having an access code modulated using a first modulation scheme and a synchronization sequence for a payload modulated using a second modulation scheme, the method having the steps of:

detecting at least part of the access code using a correlator, reconfiguring the correlator according to a timing of the access code, to detect at least part of the synchronization sequence, and demodulating the payload according to a timing of the synchronization sequence.

The access code may be split in different parts and at least two of the parts may be extracted at two different frequencies.

By such dual use of the same correlator, the receiver can be made more cost effective. Less processing or storage hardware or software can be used, or more performance can be achieved for a given amount of such hardware or software.

Other aspects of the invention include methods of receiving such signals, integrated circuits having such receivers, and systems incorporating such receivers or corresponding transceivers. Additional optional features of some embodiments are described below. Many others can be envisaged by those skilled in the art.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

Figure 1:
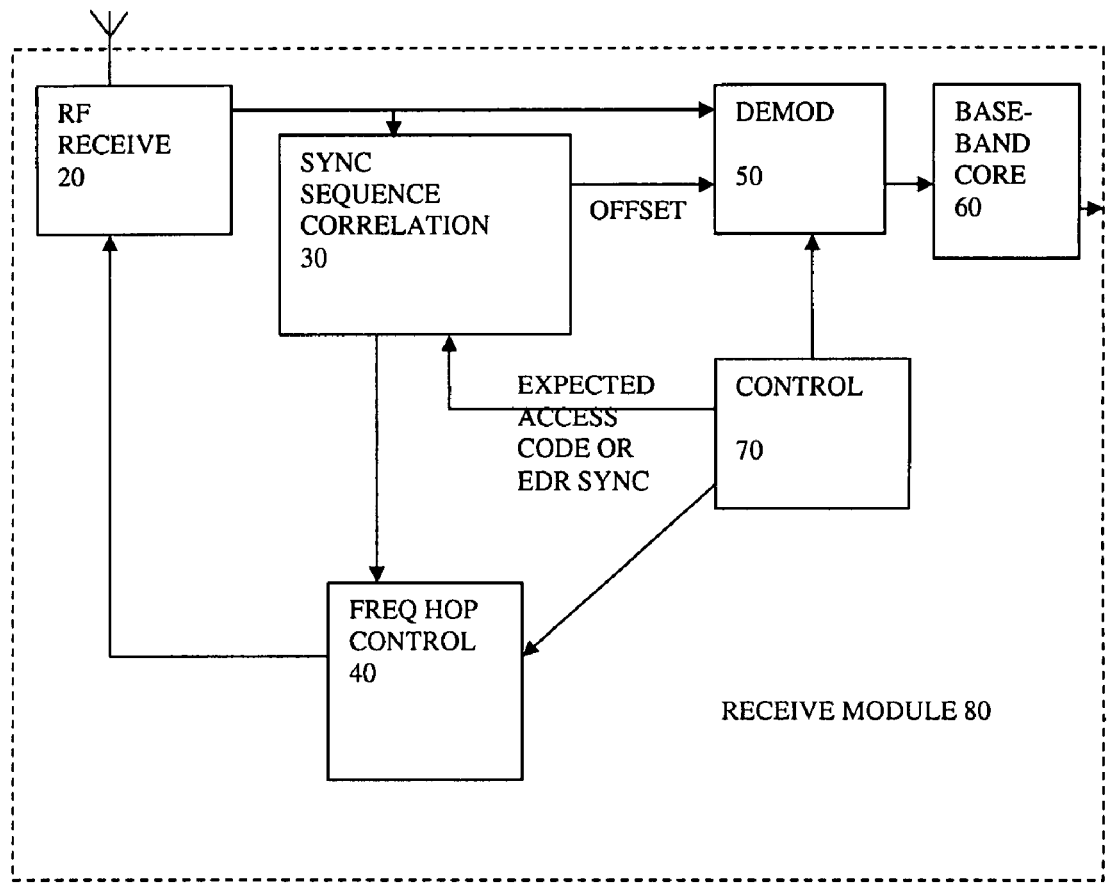
FIG. 1 shows a schematic view of a system having a receiver according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, terms such as top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

By way of introduction to the embodiments, a problem with existing receivers will be discussed. In Bluetooth systems some packets contains two synchronization words and different part of the packets are modulated with a different modulations. In the case of EDR packets, two different correlations are carried out, a first when detecting the access code before demodulation and baseband processing, and a second during baseband processing when detecting the EDR synchronization sequence. This second correlation is typically carried out by DSP circuitry in the baseband core. This is a relatively computationally intensive operation.

Embodiments of the invention provide an enhanced or more flexible correlation circuit suitable for dual use in correlating an access code and in correlating an EDR synchronization sequence. It is based on a recognition that these two correlation operations can be take place at different times and thus can be carried out serially by the same hardware, and in particular can make use of the same comparators, to reduce the number of these comparators required. It is particularly based on the recognition that these two correlation operations can be carried out serially by using configurable hardware.

FIG. 1 shows an overview of a receiver in schematic form. It shows an antenna 10, feeding RF receive part 20. This part converts RF to IF signals which can be analog or digital and are typically I and Q signals. It needs to look for different RF frequencies according to a channel hop sequence. Hence a frequency hop control part 40 feeds the RF receive part. A sync sequence correlation part 30 is used to detect the access code in the received signal and synchronize various processes by determine a timing of a received packet to start demodulation and to enable the header to be decoded and used for maintaining a predetermined frequency hop cycle.

An implementation of the correlation part 30 according to an embodiment of the invention will be described in more detail below. The received signal and a timing offset from the correlation part are fed to demodulation part 50, which outputs baseband digital signals to the baseband core part 60. This can include a wide range of processing functions of low level Bluetooth protocol layers, leading to data output at the HCI interface for use by applications. A control part 70 can be used for coordination of the various parts and to store parameters such as expected access codes or EDR sync sequences for use by the correlation part. The different functions can be segmented or integrated differently. Many other functions not shown can be included. The receiver chain can be implemented as a receive module 80. It can be for a Bluetooth link or network, or for other packet based protocols.

Figure 2:
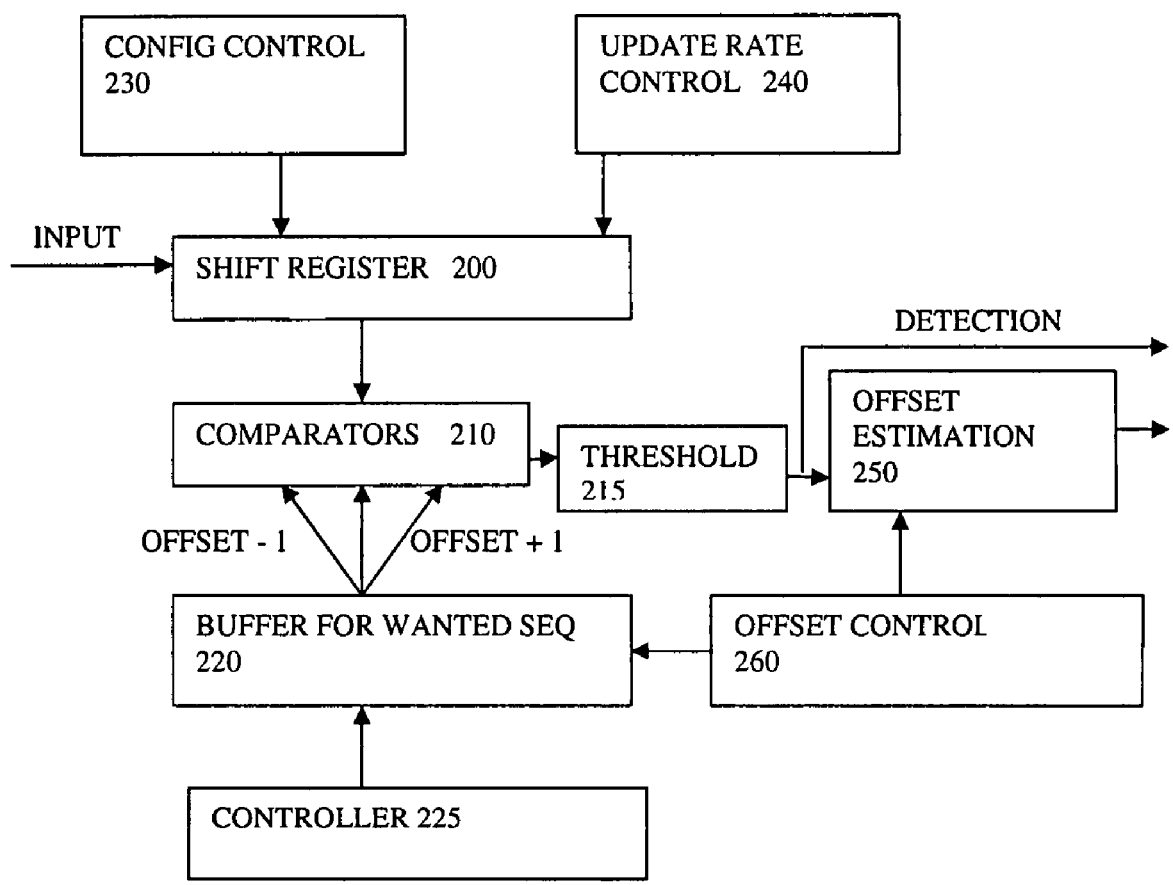
FIG. 2 shows a schematic view of a correlation part according to an embodiment.

FIG. 2 shows a schematic view of a sync sequence correlation part according to an embodiment of the invention, for use in the arrangement of FIG. 1, or in other systems. A shift register 200 receives the input signal in digital form as samples representing a sequence of values at succeeding time instants. A buffer 220 holds a wanted sequence such as the access code or the EDR sync sequence. A series of comparators and accumulators represented by item 210 carry out a correlation and threshold part 215 determines whether there is sufficient correlation to output a detection signal and optionally a separate timing signal. Part 250 outputs an offset estimation based on the timing signal.

The buffer or comparators or shift registers can be arranged to have a variable offset between the sequences being correlated. This can be regarded as providing a finer offset than the coarse offset provided by updating the shift register by clocking in a new input value or values, and shifting older ones along the register. Three offsets are shown schematically in FIG. 2, a +, a − and a zero offset, created by switching the outputs of the buffer to different comparators, typically to neighboring comparators in the sequence. An offset control part 260 is shown for controlling the offset. The configuration of the correlation operation can be altered by a configuration control part 230, which can convert the register to several shorter registers coupled in parallel to carry out several correlations in parallel. An update rate of the shift register can be altered by rate control part 240. A controller 225 is provided for controlling the reloading of the buffer with new wanted values of parts of the access code or the EDR sync sequence.

Figure 3:
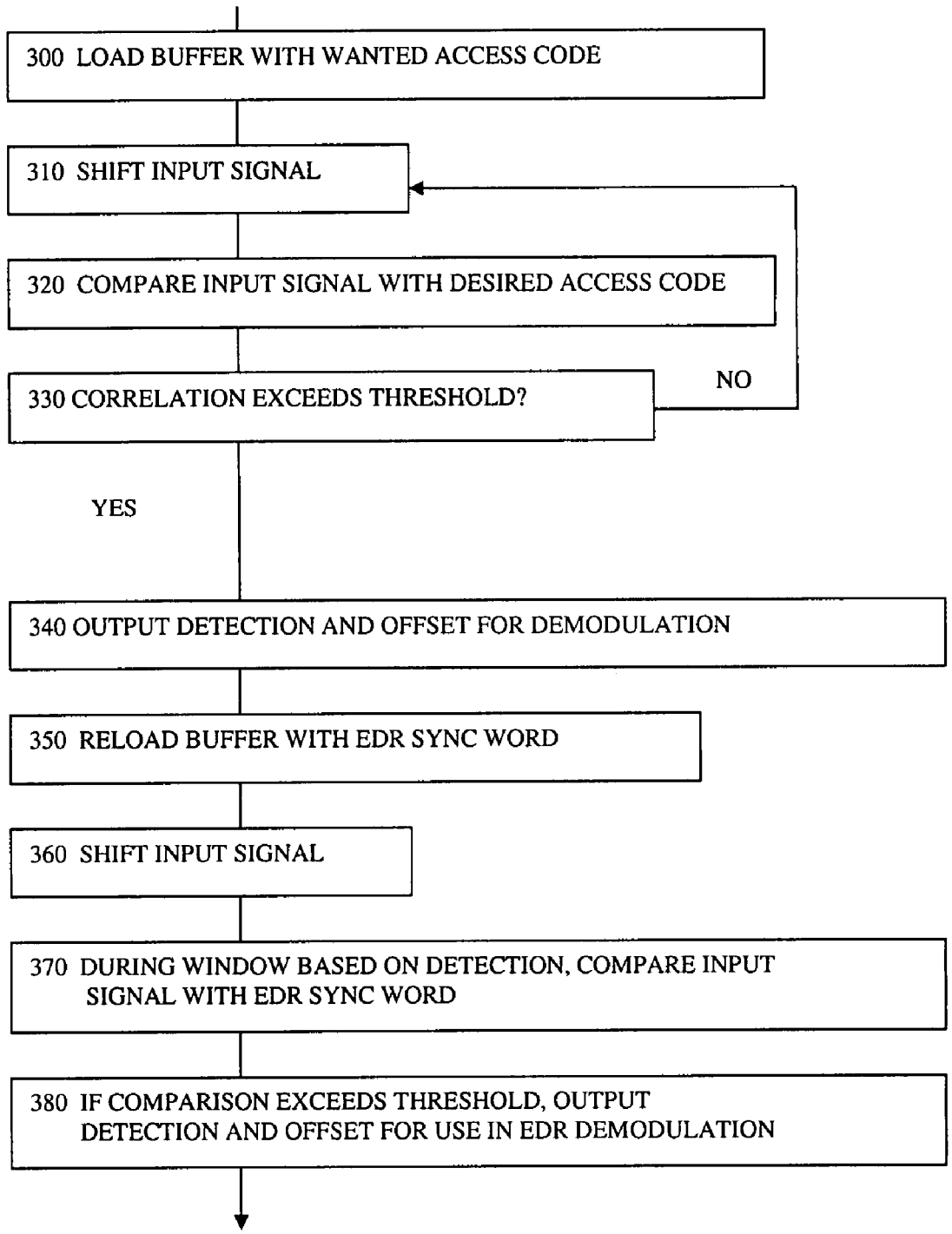
FIG. 3 shows steps of operation of an embodiment.

FIG. 3 shows a sequence of operations of the correlation part according to an embodiment of the invention. At step 300, the buffer is loaded with the wanted access code. At step 310 the input signal is shifted along the shift register. At step 320 a comparison is made and results accumulated and thresholded. If the correlation does not exceed the threshold at step 330, then steps 310 and 320 are repeated. If it does exceed the threshold, at step 340, a detection signal is output and an offset timing is used for subsequent demodulation. At step 350 the buffer is reloaded with an EDR sync sequence. The input signal is shifted at step 360, and when a time window is reached, set by the access code detection, then a correlation is carried out by comparing, accumulating and thresholding as before. If the comparison exceeds threshold then an output indicating EDR sync detection is made. Again a timing offset is output for use in the demodulation of the EDR payload. If no detection is made in the window, then it can be assumed that the packet is not an EDR packet and default processing is carried out, such as assuming the packet is a basic rate (BR) packet.

Figure 4:
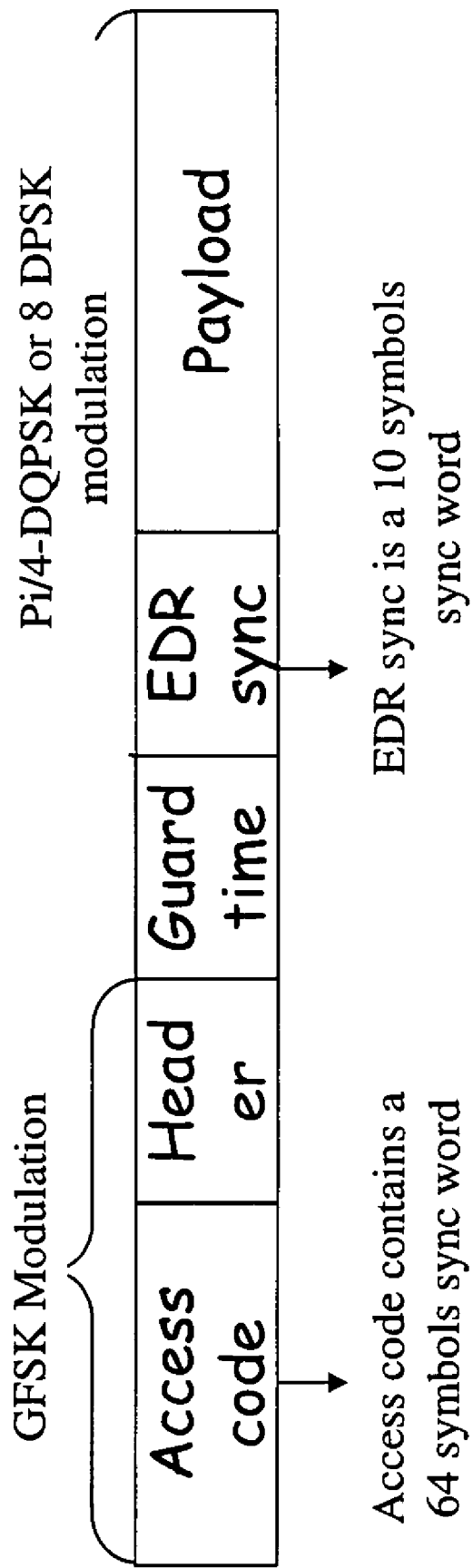
FIGS. 4 and 5 show views of signals received, and processed.

FIG. 4 shows more details of an access code and EDR sync sequence detectable by the architecture capable of making two correlations by reusing the same hardware and by minimizing the size of the hardware needed. The access code is followed by a header then a guard band, then an EDR sync sequence and finally the EDR payload. The receiver works at a certain frequency that is usually an integer multiple n of the baseband frequency f, e.g. nf=6 MHz, where the baseband frequency is 1 MHz. The following US patent applications are incorporated herewith in their entirety: U.S. patent application Ser. No. 11/503,406; U.S. patent application Ser. No. 11/503,408; U.S. patent application Ser. No. 11/503,412; and U.S. patent application Ser. No. 11/503,415.

Figure 5:
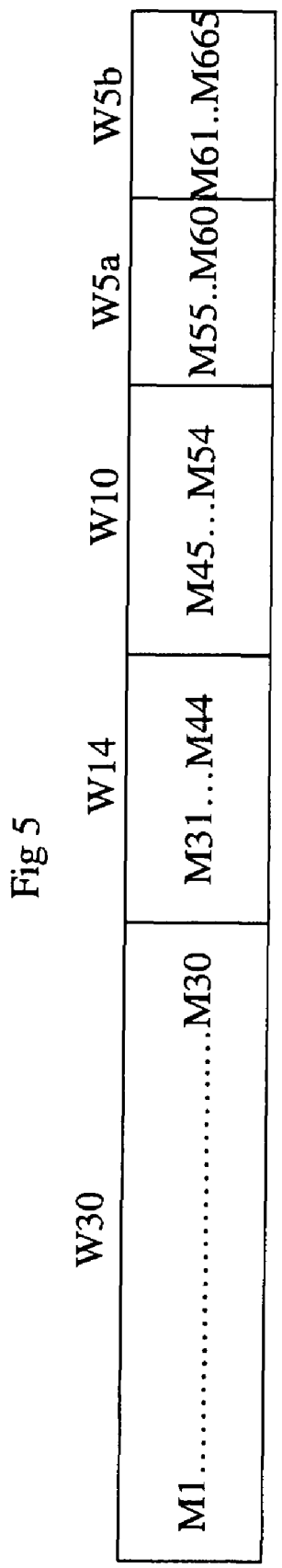

FIG. 5 shows how the access code can be split into 5 parts and each part correlated separately. The purpose of splitting up the access code is to reduce the size of the correlator used to synchronize with the access code. By making the later sections of the access code smaller means that the same size of correlator can work more accurately in determining synchronization. Thus, if a first synchronization is obtained with a first section of the access code to obtain a coarse synchronization, this can be used to obtain a more accurate synchronization from one or more of the later sections. Accordingly, an aspect of the present invention is providing a correlator arranged to detect at least part of an access information, e.g. an access code such as a Bluetooth access code, a correlator controller for reconfiguring the correlator according to a timing of the detected access information, and the reconfigured correlator detecting at least another part of the access information, e.g. a synchronisation word. In particular the granularity used in the reconfigured correlator can be smaller than for the first or previous configurations of the correlator.

Figure 6:
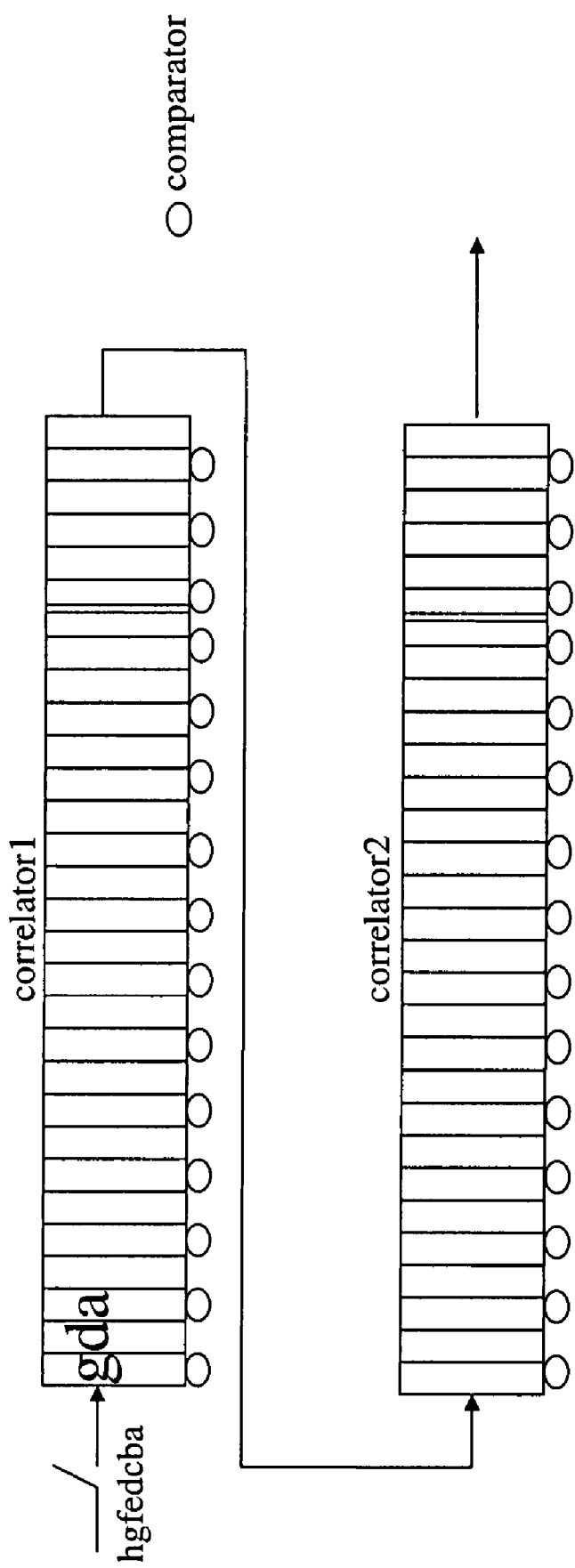
FIG. 6 shows a schematic view of a correlation part according to an embodiment.

FIG. 6 shows the first part of the correlating of the first section of access information, i.e. up to x1 symbols. X1 can be for examples 30 symbols (W30—generally x1). Optionally, the shift register can be set to an update rate less than the sampling rate, e.g. 1/n of the signal sampling rate. An example is at 2 MHz with a signal sample rate of 6 MHz. This lowers the accuracy but reduces the number of correlators required. This means discarding two samples out of 3. In this way a shift register 60 symbols long is needed to hold 30 symbols. Each symbol can be an I and a Q value or an equivalent representation of the same information. For example, the present invention includes any suitable method of representing the phase, e.g. the phase can be represented between 0 and 360 degrees with an integer number in a range, e.g. between 0 and 127, or any other range of numeric or alphanumeric symbols. Two registers (30 symbols each) are shown coupled in series to form a single shift register. There are 30 comparators all active looking for the correlation of W30.

Figure 7:
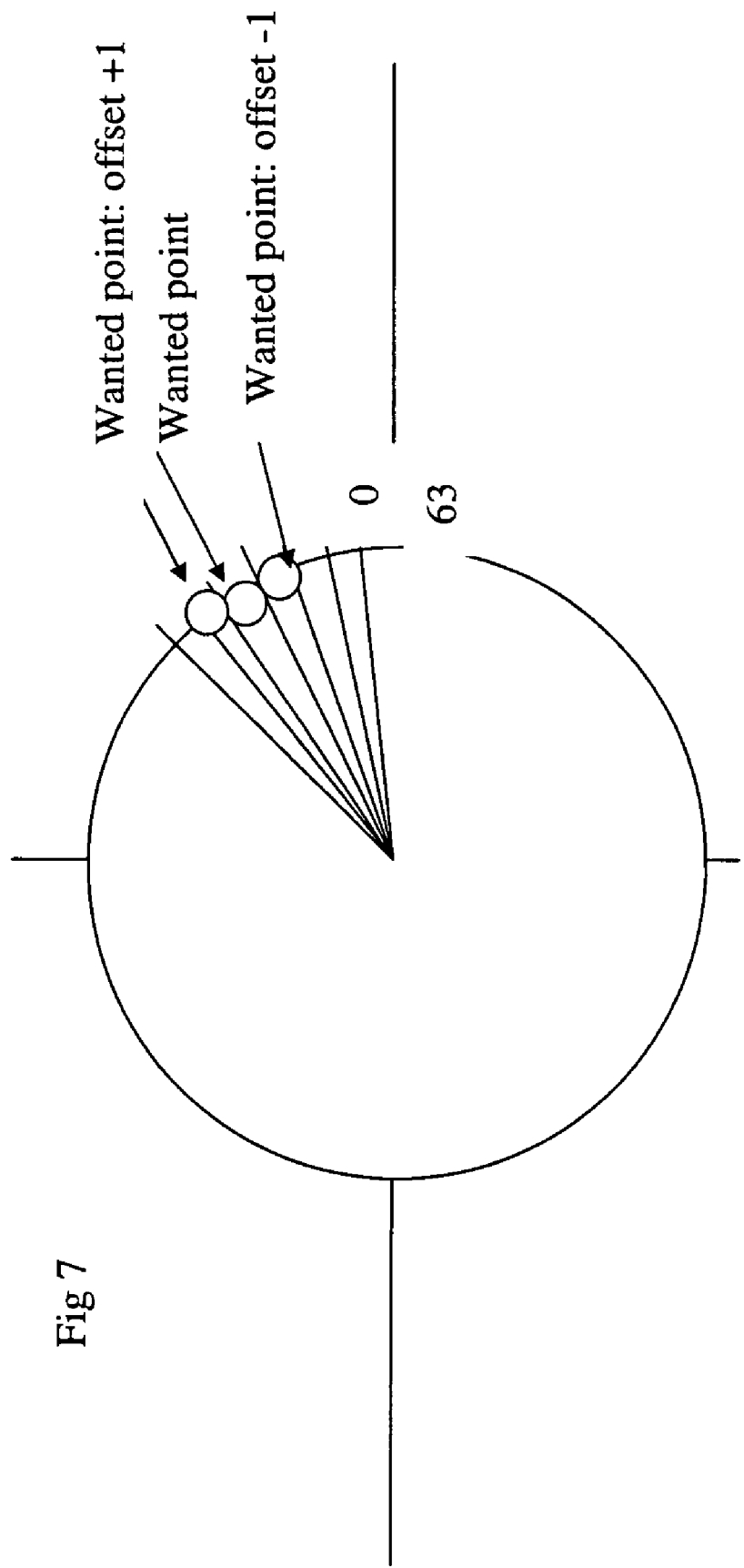
FIG. 7 shows a graph of offsets.

FIG. 7 shows a polar graph to show timing offsets as angles. Each comparator can provide an estimate of its distance from the sync point and the received point and by the sync points rotated with the received points to get the offset estimation. The frequency offset has the effect on the polar graph to rotate the constellation. The comparators are adapted to compare the distance from the expected point to the received one. The distance is representative of the offset estimation.

Having the buffers updated only at 2 MHz speed while the available clock is 6 MHz means that for three consecutive 6 MHz clock cycle the buffer content is constant. Therefore a comparator can be used three times with different offset values. With a single comparator three different offset possibilities can be evaluated. This can help reduce the number of comparators needed by 3.

Figure 8:
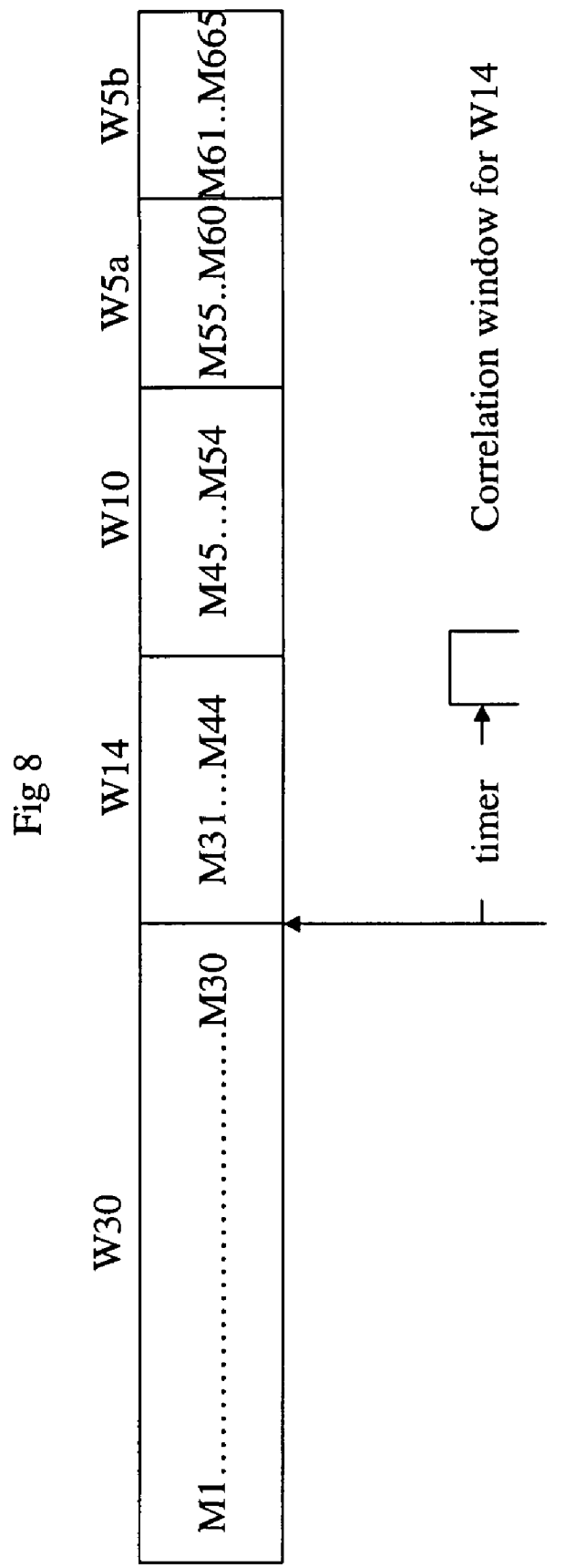
FIG. 8 shows a view of signals received, and processed.

FIG. 8 shows what happens next. Once the correlation of W30 is reached the system will still look for the same correlation (since the previous one can be a fake one) but in parallel it will start a timer since it is expecting to correlate the next x2 symbols. In general x2 can be any suitable number. For example, x2 can be smaller than x1, e.g. 14 or 17 or equal to x1, e.g. both are 20. The timer will then run for the appropriate time, e.g. if x2 is 17 symbols then after more or less 17 micros. This timer will determine a correlation window—W14 for 14 symbols or W17 for 17 symbols—generally Wx2.

Figure 9:
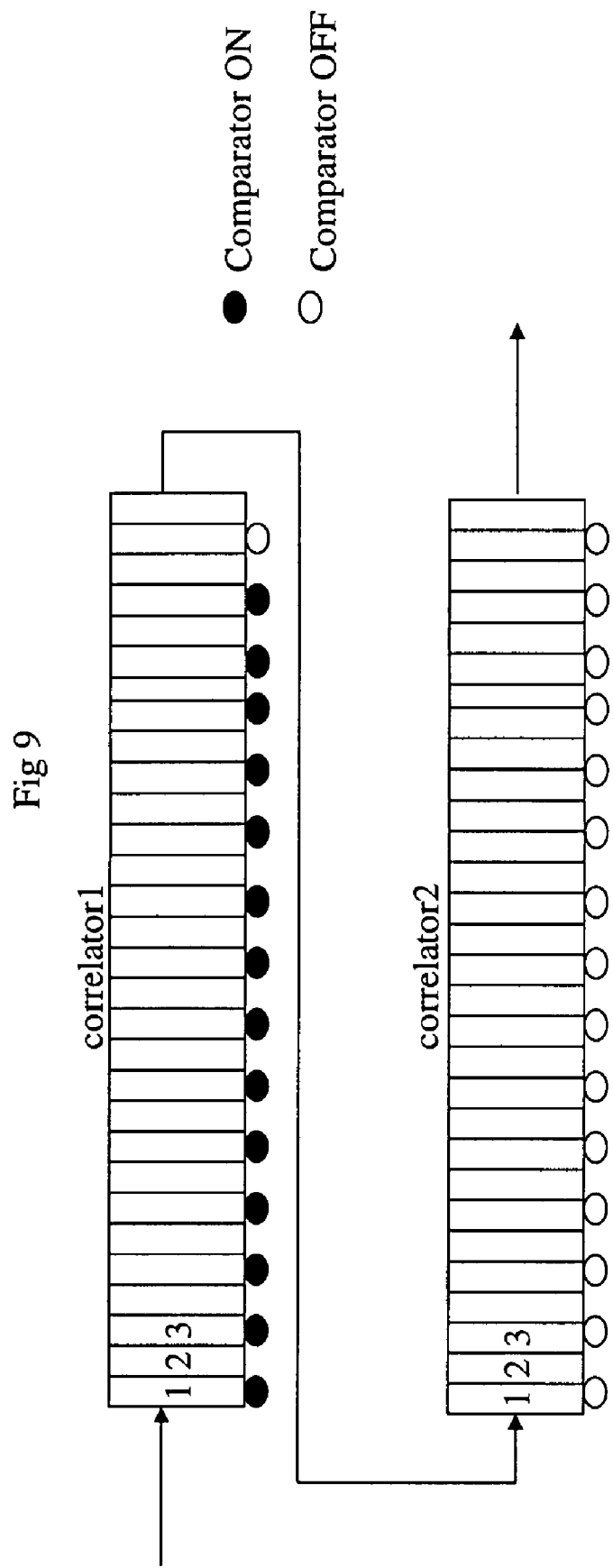
FIG. 9 shows a schematic view of a correlation part according to an embodiment.

FIG. 9 shows an alternative with 14 symbols for the second correlation window (W14). When correlation window for W14 is entered, it is only necessary to look for 14 symbols so 16 of the 30 comparators can be switched off to save power. When the sync for W14 is successfully detected, a number of events are triggered:

a) The eventual offset is anticipated by starting to give feedback to the DDM (Digital Down Mixer). The shift register update rate is increased to a higher rate. For example the rate may be increased to 6 MHz, so symbols are no longer discarded. Still the two shift registers and comparators are coupled in series to work as a single correlator. This is achieved by a general aspect of the present invention which is as follows. One aspect of the present invention is the sequential use of correlation windows, whereby one of the windows is shorter that one before it and one window is operated at a first value below the signal sampling rate and a second later window is operated at a second value equal to or below the signal sampling rate.

b) A new counter is started to determine a next timing window since it is expected to get a new sync using x3 number of symbols, e.g. 10 symbols (Wx3 or W10 sync) after more or less x3 microseconds, e.g. 10 microseconds. x3 may be smaller than or equal to x2.

Figure 10:
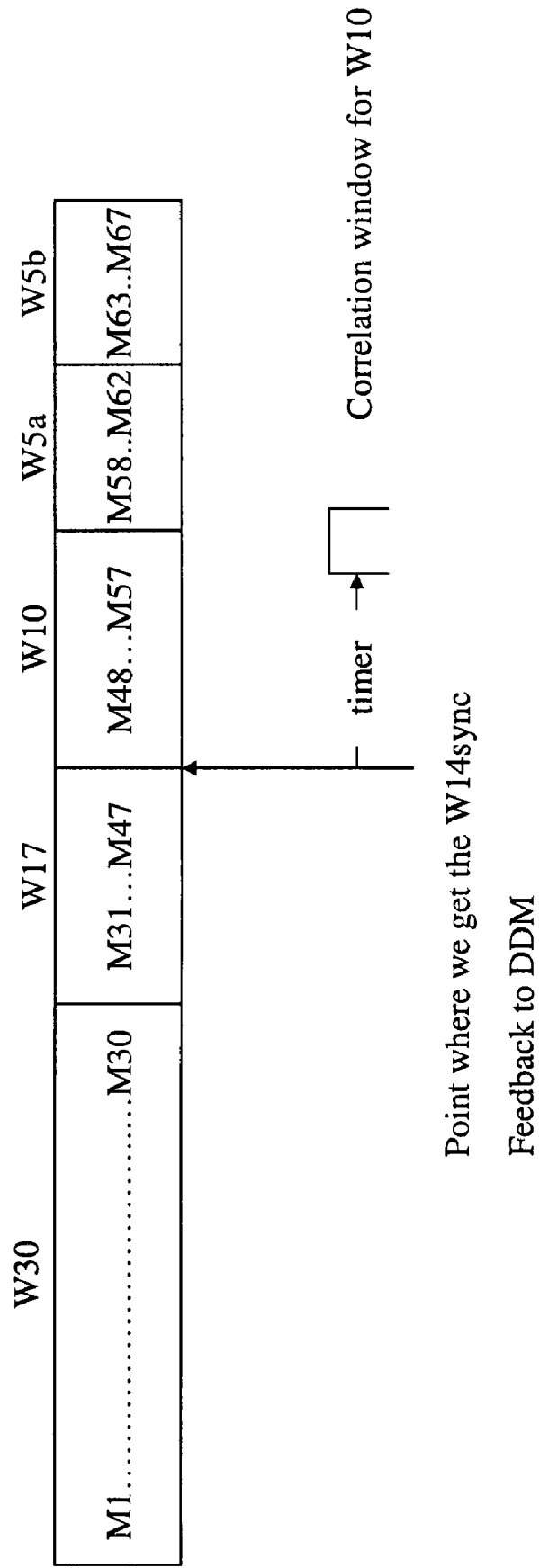
FIG. 10 shows a view of signals received, and processed.

FIG. 10 shows that once the correlation of the x2 symbols, e.g. W17, is reached the system will wait until the new correlation window is open.

Figure 11:
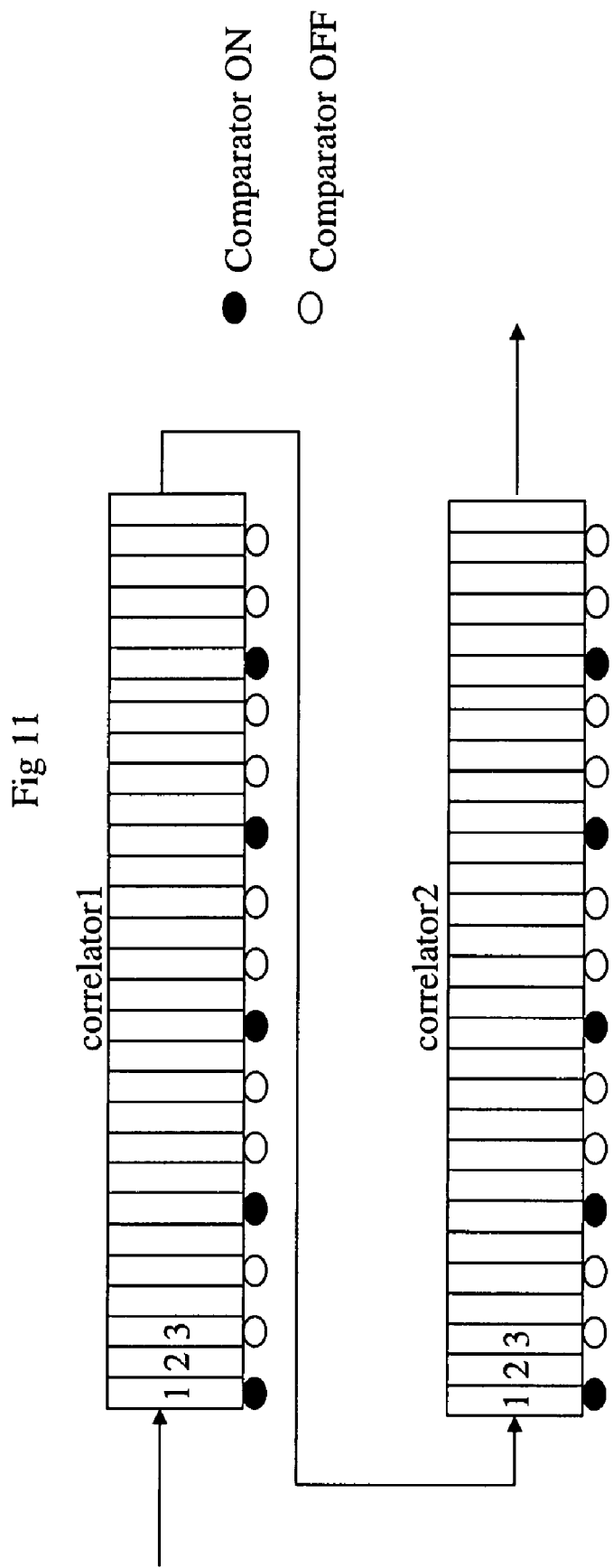
FIG. 11 shows a schematic view of a correlation part according to an embodiment.

FIG. 11 shows that when correlation window for Wx3, e.g. W10 is entered, then it is only necessary to look for x3, e.g. 10 symbols so it is possible to switch off 20 comparators.

When the sync for Wx3, e.g. W10 is achieved, further events are triggered as follows:

a) The shift register is shifted now to a higher frequency, e.g. to 12 MHz. This may be achieved for example using an interpolator filter to generate a second 6 MHz phase to be added to the first 6 MHz at a phase such that finally a 12 MHz signal is obtained. The correlator is reconfigured to be divided to work as two independent correlators. This involves dividing the shift register into two parallel coupled shift registers as shown.

Figure 12:
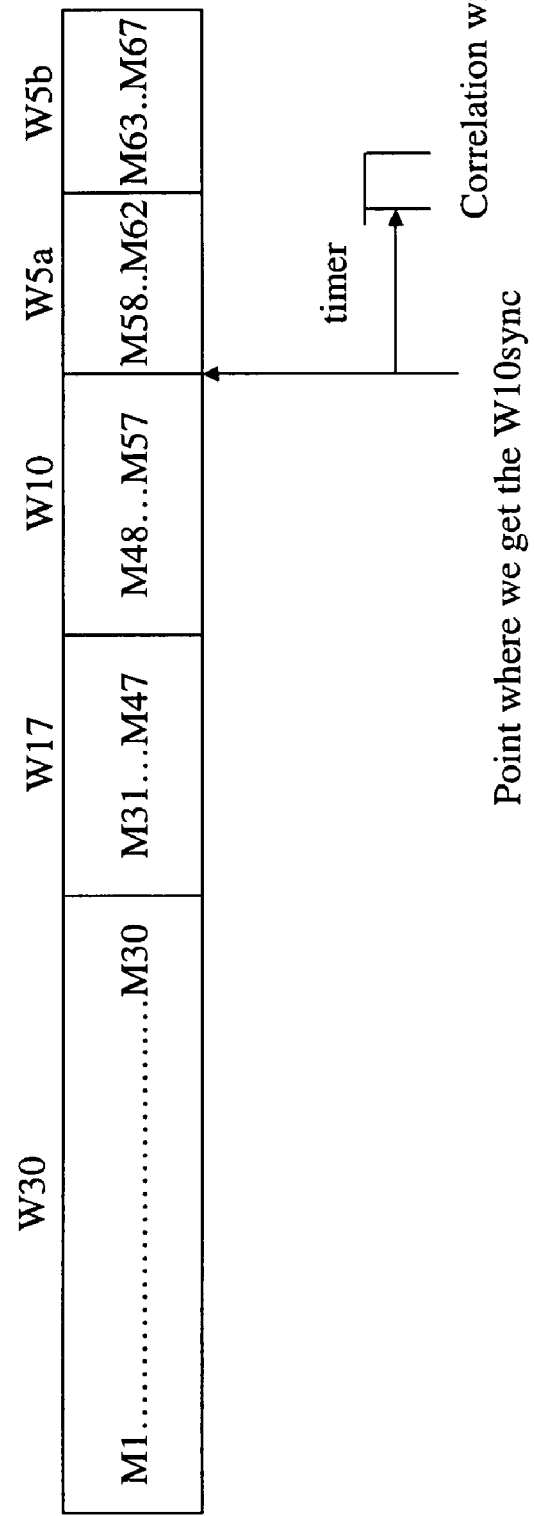
FIG. 12 shows a view of signals received, and processed.

FIG. 12 shows that once the correlation of Wx3, e.g. W10 is successfully detected, the system will wait till the next new correlation window opens. The same applies for the next window of x4 symbols, e.g. 5 symbols W5a. x4 may be smaller or equal to x3.

Figure 13:
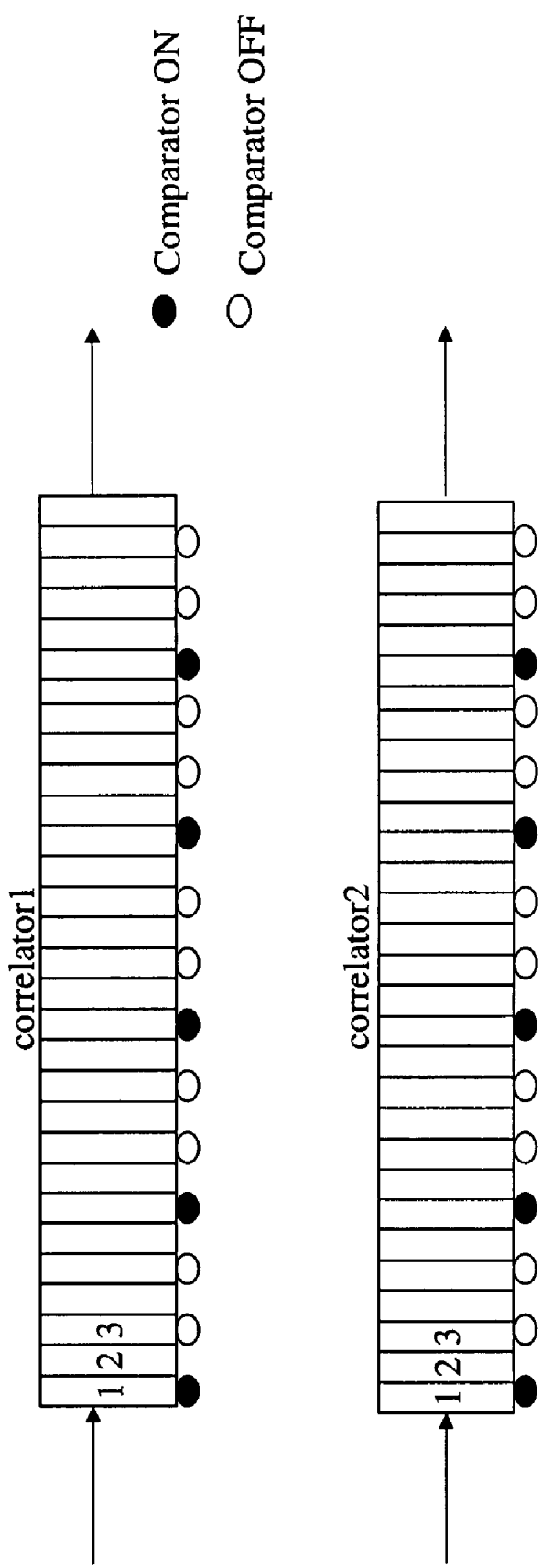
FIG. 13 shows a schematic view of a correlation part according to an embodiment.

FIG. 13 shows the situation when correlating the W5a/W5b parts when the correlation window is reached. There are two correlators in parallel each of them having a shift register having a 6 MHz input, the difference is that the buffers are smaller and only 5 symbols per input shift can be correlated.

Figure 14:
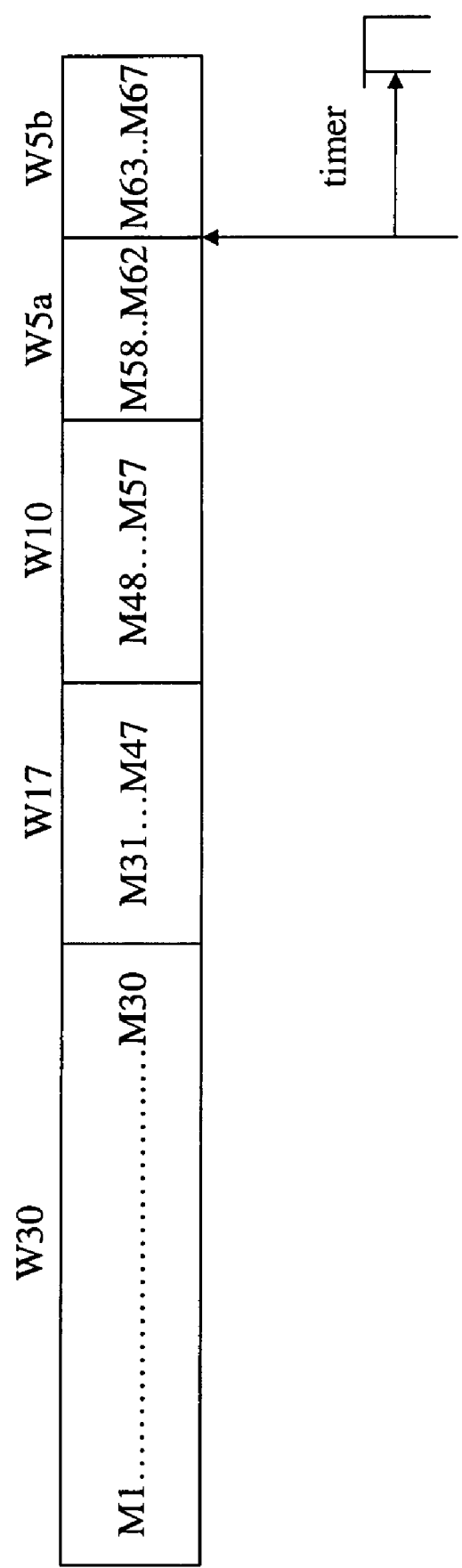
FIGS. 14 and 15 show a view of signals received, and processed.

FIG. 14 shows that once the correlation of Wx4, e.g. W10 is successfully detected, the system will wait till the next new correlation window opens. The same applies for the next window of x5 symbols, e.g. 5 symbols W5b. x5 may be smaller or equal to x4.

FIG. 14 shows the situation when correlating the W5b part. W5b is the last basic rate correlation. Once this correlation is achieved then it means that the complete basic rate correlation is achieved. The best sampling point can then be identified and the demodulation will be started.

If the W5b correlation is achieved then the complete Access Code correlation is achieved and the best sampling point can be selected and then used for the demodulation. Any method of selection of the best sampling point is included within the present invention. For example, information on the highest energy in the last correlation window can be extracted and with some averaging (e.g. any suitable form of filtering) the best sampling point is selected as the one with the highest filtered energy.

Figure 15:
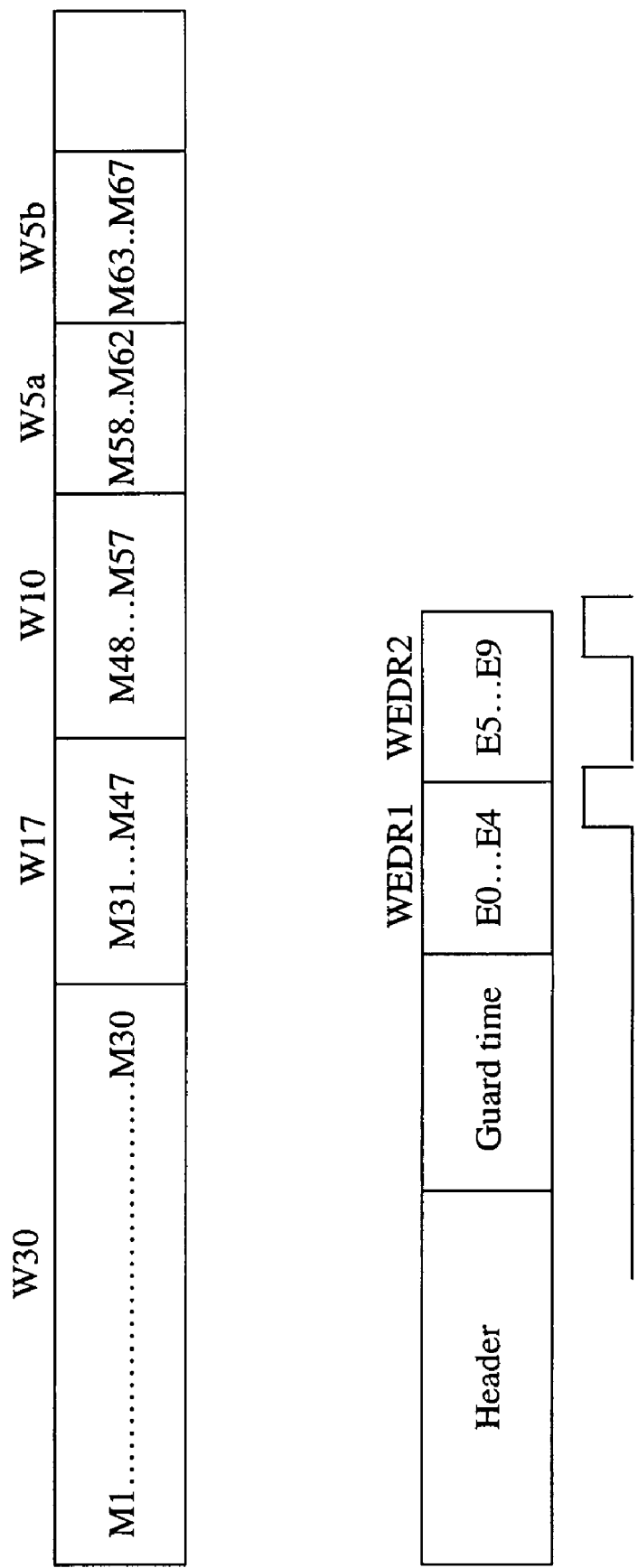

FIG. 15 shows the stage which involves correlating for an EDR packet used for the EDR sync. As before the shift register is split in two and the very same hardware and hardware configuration is used as per w5a, w5b described above.

An example of a single chip transceiver to which embodiments of the invention can be applied is the STLC2500 from STmicroelectronics. The receiver part of this implements a low-IF receiver for Bluetooth modulated input signals. The radio signal is taken from a balanced RF input and amplified by an LNA. The mixers are driven by two quadrature LO signals, which are locally generated from a VCO signal running at twice the frequency. The I and Q mixer output signals are band pass filtered by a poly-phase filter for channel filtering and image rejection. The output of the band pass filter is amplified by a VGA (variable gain amplifier) to the optimal input range for the A/D converter. Further channel filtering is done in the digital part. The digital part demodulates the GFSK coded bit stream by evaluating the phase information in the digital I and Q signals. RSSI data is extracted. Overall automatic gain amplification in the receive path is controlled digitally. The RC time constants for the analogue filters are automatically calibrated on chip. The correlation part and other parts described above can be integrated on chip.

Other elements can include a header decoder memory for storing the transceiver unit's Unit ID, and a clock. These elements may be integrated together and may be carried out in software or in hardware.

The receiver can store or be supplied with an access code signal specifying the Access Code of the packet which the unit is expecting to receive. The receiver can accept those received radio packets with Access Codes which correspond to the expected Access Codes and can reject those with Access Codes that do not correspond. If the radio packet is accepted then the radio packet is supplied to the header decoder as signal. A confirmation signal can be sent and is used by the controller in a slave unit to resynchronize the slave clock to the master clock.

As has been described above, a circuit for processing a packet based signal received over a Bluetooth radio link has a correlator (200, 210, 215, 220) to detect at least part of the access code. A correlator controller (230, 240, 260), reconfigures the correlator according to a timing of the access code, to detect at least part of the EDR synchronization sequence, and a demodulator demodulates the payload according to the detection. The correlator has an input signal register (200), a buffer (220) for a sequence of at least part of the wanted signal values, and a series of comparators (210) arranged to compare input signal values with corresponding ones of the wanted signal values at more than one offset. By such dual use of the same correlator, the receiver can be made more cost effective.

Additional features described above of some of the embodiments include the following. The correlator having an input signal register, a buffer for a sequence of at least part of the wanted signal values, and a series of comparators arranged to compare each of a sequence of input signal values in the shift register with corresponding ones of the sequence of wanted signal values in the buffer, with an adjustable offset between the sequences, and accumulate the comparisons.

The correlator being arranged to evaluate correlation at more than one offset before the controller updates the input signal register.

The controller being arranged to detect a first part of the access code, and according to the detection of the first part, to alter the sequence of wanted values to detect a further part of the access code, or to detect the synchronization sequence.

The controller being arranged to reconfigure the correlator by altering any of: an update rate of the input signal register, a length of the sequences, which ones of the comparators are switched off, or a division of the input signal register into two or more parallel coupled shift registers.

The receiver having an interpolator for altering a rate of the input signal input to the input signal register.

The controller being arranged to use the detection of at least part of the access code to set a correlation window for a subsequent correlation.

The received radio signal being a Bluetooth protocol signal.

The synchronization sequence being an EDR synchronization sequence, and the access code being a basic rate access code.

A receiver can have an RF receive part for providing an IF output, a circuit as set out above, for processing the IF output as an input signal, a demodulator for demodulating the input signal according to an output of the circuit, and a baseband processing part.

Other variations and additions can be envisaged by those skilled in the art within the scope of the claims.

The invention claimed is:

1. A circuit for processing a packet based signal received over a radio link and having a data packet having an access code modulated using a first modulation scheme and a synchronization sequence for a payload modulated using a second modulation scheme, the circuit comprising:
a correlator arranged to detect at least part of the access code,
a correlator controller to reconfigure the correlator according to a timing of the access code, to detect at least part of the synchronization sequence, and
a demodulator for demodulating the payload according to a timing of the synchronization sequence.

2. The circuit of claim 1, the correlator comprising:
an input signal shift register,
a buffer for a test sequence of at least part of wanted signal values, and
a series of comparators arranged to compare each of an input sequence of input signal values in the shift register with corresponding values of the test sequence of the wanted signal values in the buffer, with an adjustable offset between the test and input sequences, and accumulate the comparisons.

3. The circuit of claim 2, the correlator being arranged to evaluate correlation at more than one offset before the controller updates the input signal register.

4. The circuit of claim 2, the controller being arranged to detect a first part of the access code, and according to the detection of the first part, to alter the test sequence of wanted values to detect a further part of the access code, or to detect the synchronization sequence.

5. The circuit of claim 2, the controller being arranged to reconfigure the correlator by altering any of: an update rate of the input signal register, a length of the test and input sequences, which ones of the comparators are switched off, or a division of the input signal register into two or more parallel coupled shift registers.

6. The circuit of claim 2, further comprising an interpolator for altering a rate of the input signal input to the input signal register.

7. The circuit of claim 1, the controller being arranged to use the detection of at least part of the access code to set a correlation window for a subsequent correlation.

8. The circuit of claim 1, the received radio signal being a Bluetooth protocol signal.

9. The circuit of claim 1, the synchronization sequence being an enhanced data rate (EDR) synchronization sequence, and the access code being a basic rate access code.

10. The circuit of claim 1, the circuit being configured to split up the access code into different parts.

11. The circuit of claim 10, the circuit being configured to extract at least two of the parts at two different frequencies.

12. A receiver having a radio frequency (RF) receive part for providing an intermediate frequency (IF) output, a circuit as according to claim 1 for processing the IF output as an input signal, a demodulator for demodulating the input signal according to an output of the circuit, and a baseband processing part.

13. A system having the receiver of claim 12, and an application part coupled to an output of the baseband processing part.

14. A method of processing a packet based signal received over a radio link, the signal having a data packet having an access code modulated using a first modulation scheme and a synchronization sequence for a payload modulated using a second modulation scheme, the method comprising acts of:
detecting at least part of the access code using a correlator,
reconfiguring the correlator according to a timing of the access code, to detect at least part of the synchronization sequence, and
demodulating the payload according to a timing of the synchronization sequence.

15. The method of claim 14, further comprising comparing each value of an input sequence of input signal values with corresponding values of a test sequence of wanted signal values, with an adjustable offset between the sequences, and accumulating the comparisons.

16. The method of claim 15, further comprising evaluating a correlation at more than one offset.

17. The method of claim 15, further comprising detecting a first part of the access code, and according to the detection of the first part, altering the sequence of wanted values to detect a further part of the access code, or detecting the synchronization sequence.

18. The method of claim 15, further comprising interpolating the input signal to alter a rate of the input signal.

19. The method of claim 14, further comprising using the detection of at least part of the access code to set a correlation window for a subsequent correlation.

20. The method of claim 14, the received radio signal being a Bluetooth protocol signal.

21. The method of claim 14, the synchronization sequence being an enhanced data rate (EDR) synchronization sequence, and the access code being a basic rate access code.

22. The method of claim 14, further comprising splitting up the access code into different parts.

23. The method of claim 22, further comprising extracting at least two of the parts at two different frequencies.

24. A circuit comprising:
a correlator configured to detect at least part of a received access code in at least one data packet of a communication link using a first correlation scheme; and
a correlator controller configured to reconfigure the correlator to detect at least part of a received synchronization sequence in the at least one packet using a second correlation scheme, the reconfiguring responsive to the detection of the at least part of the access code, wherein the access code is modulated according to a first modulation scheme and the synchronization sequence is modulated according to a first modulation scheme different from the first modulation scheme.

25. The circuit of claim 24, wherein the communication link utilizes a Bluetooth communication protocol.

26. The circuit of claim 24, wherein the synchronization sequence is modulated according to an enhanced data rate (EDR) standard.

27. The circuit of claim 24, wherein the correlator comprises:
a series of comparators arranged to compare each value of an input sequence of received signal values with corresponding values of a test sequence of wanted signal values for detecting the at least part of the received access code.

28. The circuit of claim 27, further including an input signal register to store the input signal sequence, and wherein the correlator is configured to evaluate a correlation at more than one offset before the input signal register is updated.

29. The circuit of claim 28, wherein the correlator controller is configured to reconfigure the correlator by altering any of: an update rate of the input signal register, a length of the test and input sequences, which ones of the comparators are switched off, or a division of the input signal register into two or more parallel coupled shift registers.

30. The circuit of claim 24, wherein the correlator controller is configured to set a correlation window for a subsequent correlation based upon the detection of the at least part of the access code.

31. The circuit of claim 30, wherein the correlation window is set to detect the at least part of the synchronization sequence.

* * * * *